(12) United States Patent
Yoshikawa

(10) Patent No.: US 9,366,301 B2
(45) Date of Patent: Jun. 14, 2016

(54) FRICTION PAD ASSEMBLY FOR DISK BRAKE

(71) Applicant: AKEBONO BRAKE INDUSTRY CO., LTD., Tokyo (JP)

(72) Inventor: Kazuhiro Yoshikawa, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/394,500

(22) PCT Filed: Mar. 15, 2013

(86) PCT No.: PCT/JP2013/057538
§ 371 (c)(1),
(2) Date: Oct. 15, 2014

(87) PCT Pub. No.: WO2013/157337
PCT Pub. Date: Oct. 24, 2013

(65) Prior Publication Data
US 2015/0075927 A1    Mar. 19, 2015

(30) Foreign Application Priority Data
Apr. 16, 2012 (JP) ................. 2012-093293

(51) Int. Cl.
*F16D 65/092* (2006.01)
*B61H 5/00* (2006.01)
*F16D 65/097* (2006.01)
*F16D 69/04* (2006.01)

(52) U.S. Cl.
CPC ............ *F16D 65/092* (2013.01); *B61H 5/00* (2013.01); *F16D 69/0408* (2013.01); *F16D 65/0972* (2013.01); *F16D 2069/0433* (2013.01)

(58) Field of Classification Search
CPC ............ B61H 5/00; F16D 2069/0425; F16D 2069/0433; F16D 2069/0441; F16D 65/092; F16D 65/095; F16D 65/0972; F16D 69/0408
See application file for complete search history.

(56) References Cited

U.S. PATENT DOCUMENTS

| 5,538,108 | A | 7/1996 | Russo |
| 5,934,418 | A | 8/1999 | Wirth |
| 8,919,503 | B2* | 12/2014 | Hiramatsu ............... B61H 5/00 188/250 B |
| 2012/0298458 | A1 | 11/2012 | Hiramatsu et al. |

FOREIGN PATENT DOCUMENTS

| EP | 2 088 050 A2 | 8/2009 |
| JP | H10-507250 A | 7/1998 |
| JP | 2005-330978 A | 12/2005 |

(Continued)

OTHER PUBLICATIONS

Notification of First Office Action issued Feb. 24, 2016 in counterpart Chinese Patent Application No. 201380019984.1 (6 pages) with an English Translation (7 pages).

*Primary Examiner* — Anna Momper
(74) *Attorney, Agent, or Firm* — Drinker Biddle & Reath LLP

(57) ABSTRACT

A disk brake friction pad assembly includes lining assemblies which are oscillatably inserted into the guide hole portions of a guide plate to transmit a braking torque from plate engagement portions to the guide plate and are urged toward the guide plate by spring members, and a link plate for applying pressure from a torque receiving plate to the multiple lining assemblies and also for holding a clearance between the guide plate and torque receiving plate.

4 Claims, 7 Drawing Sheets

(56) References Cited

FOREIGN PATENT DOCUMENTS

| JP | 2006-207625 A | 8/2006 |
| JP | 2007-002998 A | 1/2007 |
| JP | 2007-263276 A | 10/2007 |
| JP | 4090499 B2 | 5/2008 |
| JP | 2009-185946 A | 8/2009 |
| JP | 2011-033132 A | 2/2011 |
| WO | WO-2011/081178 A1 | 7/2011 |

* cited by examiner

FRICTION PAD ASSEMBLY FOR DISK BRAKE

TECHNICAL FIELD

The present invention relates to an improved disk brake friction pad assembly.

BACKGROUND ART

A disk brake apparatus includes a disk rotor to be fixed to an axle, a disk brake friction pad assembly constituted of a torque receiving plate disposed opposed to the disk rotor and lining members assembled to the disk rotor side surface of the torque receiving plate, and a brake caliper to be fixed to a vehicle body frame and including therein an actuator for advancing and retreating the torque receiving plate with respect to the disk rotor, whereby a braking force is generated by sliding friction caused when the torque receiving plate is advanced toward the disk rotor to thereby press the lining members against the disk rotor.

In a disk brake apparatus for a railway vehicle, since a disk rotor and a friction pad assembly are large in size, when lining members to be pressed against the disk rotor are formed of integral parts, such area of the lining members as is not contacted with the disk rotor is increased due to the undulation of the disk rotor caused by frictional heat or the like, whereby stable frictional area cannot be maintained and thus stable braking characteristics cannot be secured.

In solving such problems, there is provided a friction pad assembly in which multiple second link plates are arranged substantially in a plane on the torque receiving plate, a large number of first link plates are independently swingably on the second link plates, and a large number of lining assemblies are arranged independently swingably on the first link plates, whereby as the torque receiving plate moves toward the disk rotor, the lining assemblies on the first link plates are contacted with the disk rotor (see the patent document 1).

In the thus-structured friction pad assembly, the finely divided lining assemblies are contacted with the disk rotor surface through their individual swinging operations following the undulated surface of the disk rotor, thereby being able to maintain a stable friction area and thus stable braking performance.

There is also proposed a disk brake friction pad assembly with the above friction pad assemblies improved which includes a rotation preventive device for preventing the rotation of the lining assemblies when they are pressed against the disk rotor, thereby preventing the occurrence of braking torque transmission loss and brake noises (see the patent document 2).

CITATION LIST

Patent Document

[PATENT DOCUMENT 1] Japanese Patent Publication No. 10-507250
[PATENT DOCUMENT 2] Japanese Patent Publication No. 2006-207625

SUMMARY OF INVENTION

Technical Problem

In the friction pad assembly disclosed in the above-cited patent document 1, the position regulation of the lining assemblies on the torque receiving plate is attained by a first universal joint connecting the lining assemblies to the first link plates swingably through spherical surface contact portions in both of a direction parallel to the surfaces of the lining assemblies and a direction perpendicular thereto.

The position regulation of the second link plates on the first link plates is also attained by a second universal joint connecting the first link plates to the second link plates swingably through spherical surface contact portions in both of a direction parallel to the surfaces of the lining assemblies and a direction perpendicular thereto.

Therefore, a braking torque applied to the lining assemblies in braking is wholly transmitted, through the spherical surface contact portions of the universal joint, from the lining assemblies to the first link plates and from the first link plates to the second link plates in this order, and is finally transmitted to the torque receiving plate. Thus, unless the respective universal joints are structured firm and the spherical surface contact portions thereof are worked with high precision, an excessive load can be concentrated onto some of the universal joints to thereby damage them.

However, since the universal joints are used in many portions, when they are all structured firm and their spherical surface contact portions and the contact portions of their partner members are worked with high precision, the working costs of the parts are high, which increases the cost of the friction pad assembly and degrades the productivity thereof.

Also, the hold structure of the lining assemblies must be devised to prevent the lining assemblies from falling unexpectedly when the friction pad assemblies are in transport and when maintaining the disk brake apparatus. However, when such device increases the number of parts, the increased number of parts increases the cost of the lining assemblies and the increased number of assembling steps following the increased number of parts degrades the productivity thereof.

In the disk brake friction pad assembly, since the multiple lining assemblies are arranged in a plane, unless the lining assemblies are devised to absorb the dimension tolerance in the thickness direction thereof, the dimension tolerance causes the contact performance of the lining assemblies with the disk rotor to vary, thereby making it difficult to maintain stable braking performance.

Also, in the friction pad assembly disclosed in the above-cited patent document 2, since the rotation preventive device for preventing the lining assemblies against rotation when they are pressed against the disk rotor is constituted of multiple pins engaged with the engagement grooves of the lining assemblies and the engagement holes of the torque receiving plate, the number of parts is increased to thereby increase the cost and also the increased number of assembling steps following the increased number of parts degrades the productivity.

The invention aims at solving the above problems. Thus, it is an object of the invention to provide a friction pad assembly which can ease the working precision of parts used and reduce the weights of the parts to thereby realize cost reduction and enhanced productivity, and allows the thickness-direction dimension tolerance of the lining assemblies to thereby prevent the contact performance of the lining assemblies with the disk rotor against variation, and thus can maintain stable braking performance free from the influence of the thickness-direction dimension tolerance of the lining assemblies. It is another object of the invention to provide a disk brake friction pad assembly which can regulate the rotation of the lining assemblies caused by contact with the disk rotor to thereby prevent the occurrence of braking torque transmission loss and brake noises.

Solution to Problem

The above object of the invention is attained by the following structures.

(1) A disk brake friction pad assembly, comprising:
   a guide plate for receiving a braking torque; and
   a plurality of lining assemblies oscillatably supported by the guide plate to be pressed against a disk rotor,
   wherein each of the lining assemblies includes, in a back plate portion thereof fixed to the back of a friction member, a plate engagement portion with an outer peripheral surface thereof oscillatably engaged with a guide hole portion formed in the guide plate and a retaining flange portion having an outer diameter larger than the guide hole portion,
   each of the lining assemblies is inserted into the guide hole portion from the back of the guide plate so as to transmit a braking torque generated at the time of contact between the disk rotor and the friction member from the plate engagement portion to the guide plate,
   each of the lining assemblies is supported and urged toward the guide plate by a spring member provided on the back of the back plate portion, and
   an outer peripheral portion of a torque receiving plate is fixed to the guide plate with a clearance between the back plate portion and itself, and
   a link plate straddling over the lining assemblies for applying a pressure from the torque receiving plate to the lining assemblies is fixed between the torque receiving plate and the guide plate at a vicinity of a central portion of the torque receiving plate and the guide plate, so as to hold a clearance between the guide plate and the torque receiving plate.

(2) The disk brake friction pad assembly according to the above (1),
   wherein the link plate includes a rotation preventive mechanism engaged with an engagement groove recess-formed in the back plate portion so as to prevent the lining assemblies against rotation.

(3) The disk brake friction pad assembly according to the above (1) or (2),
   wherein a heat insulation member is interposed between the back plate portion and the spring member.

(4) The disk brake friction pad assembly according to any one of the above (1) to (3),
   wherein the link plate include a spring mechanism urging the back plate portion toward the guide plate.

According to the above-structured disk brake friction pad assembly, a braking torque applied to the lining assemblies in braking is transmitted to the guide plate and is further transmitted direct to the torque receiving plate with the guide plate fixed thereto.

The pressure pressing the lining assemblies against the disk rotor is applied from the torque receiving plate through the link plates and spring members to the back plate portions of the lining assemblies.

That is, since the member for receiving the braking toque from the lining assemblies and the members for applying the pressure to the lining assemblies are provided separately, a braking torque providing a large load is not applied to the contact portions of the spring members applying pressure to the lining assemblies with the lining assemblies nor to the contact portions of the spring members with the link plates.

To the vicinity of the central portion of the torque receiving plate having an outer peripheral portion fixable to the guide plate with a clearance between the back plate portion of the lining assembly and itself and to the vicinity of the central portion of the guide plate, there are provided the link plates, which can support a portion of the pressure applied to the torque receiving plate in the vicinity of the central portion of the torque receiving plate. Thus, the rigidity of the torque receiving plate 3 with its outer peripheral portion fixed to the guide plate 11 is higher than when the link plates are not provided, thereby being able to reduce the plate thickness of the torque receiving plate itself.

Therefore, due to the eased working precision of parts used and the reduced weight thereof, cost reduction and productivity enhancement can be realized.

DESCRIPTION OF EMBODIMENTS

Description is given specifically of a disk brake friction pad assembly according to an embodiment of the invention with reference to the drawings.

FIGS. 1 to 4 show a disk brake friction pad assembly according to an embodiment of the invention.

Figure 1:
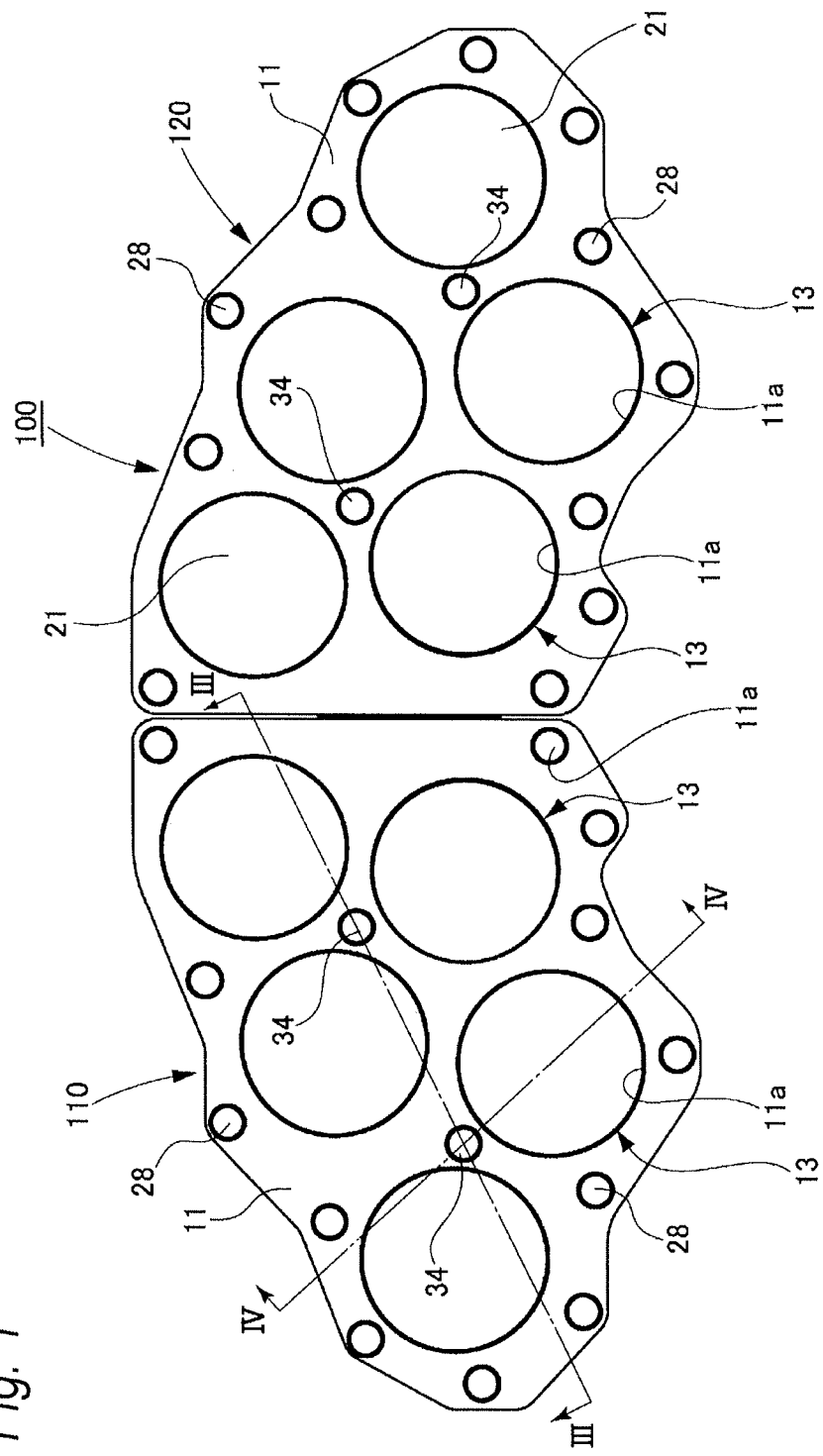
FIG. 1 is a front view of two unit friction pad assemblies constituting a disk brake friction pad assembly according to an embodiment of the invention.
Figure 2:
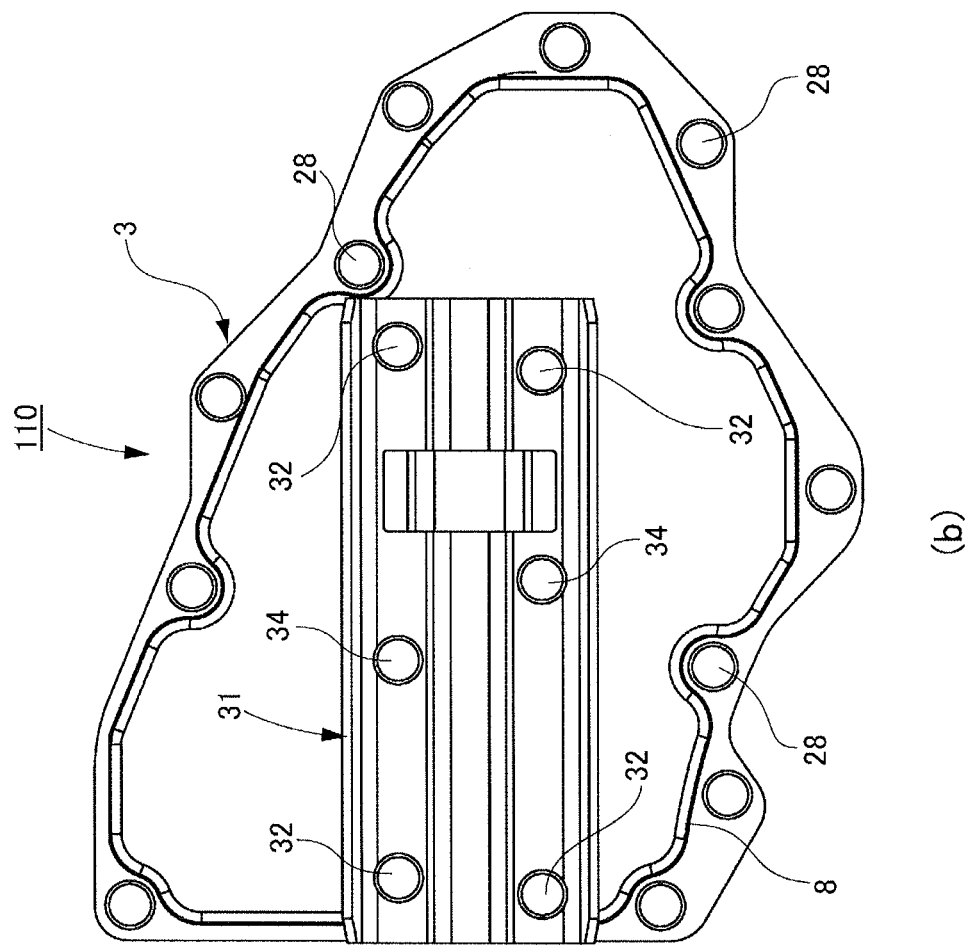
FIG. 2(a) is a side view of one of the two unit friction pad assemblies shown in FIG. 1
FIG. 2(b) is a back view of the unit friction pad assembly shown in FIG. 2(a).
Figure 2:
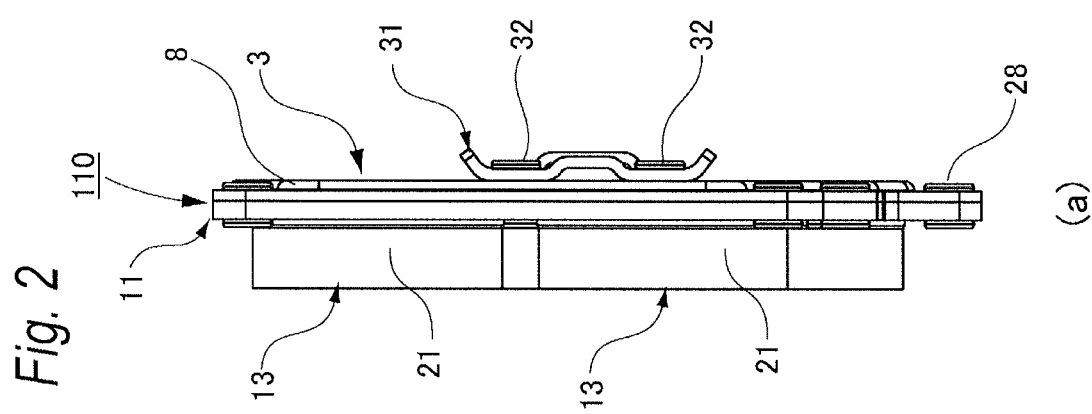

As shown in FIG. 1, a disk brake friction pad assembly 100 according to the embodiment is used for a railway vehicle disk brake apparatus and is composed of two unit friction pad assemblies 110 and 120 arranged side by side in the peripheral direction of a disk rotor (not shown) provided on an axle.

The unit friction pad assemblies 110 and 120 are structured similarly. They are respectively opposed to the disk rotor and can be driven to advance and retreat with respect to the disk rotor by an actuator built in a brake caliper (not shown).

The friction pad assemblies 110 and 120, as shown in FIGS. 2(a) to 4, each includes a torque receiving plate 3 driven to advance and retreat with respect to the disk rotor by an actuator (not shown), two kinds of link plate 5, 6 opposed and fixed to the disk rotor side surface (front surface) of the torque receiving plate 3, a guide plate 11 to be connected and fixed to the disk rotor side of the torque receiving plate 3, and multiple (in this embodiment, five) lining assemblies 13 oscillatably engaged with and supported by the guide plate 11.

Figure 3:
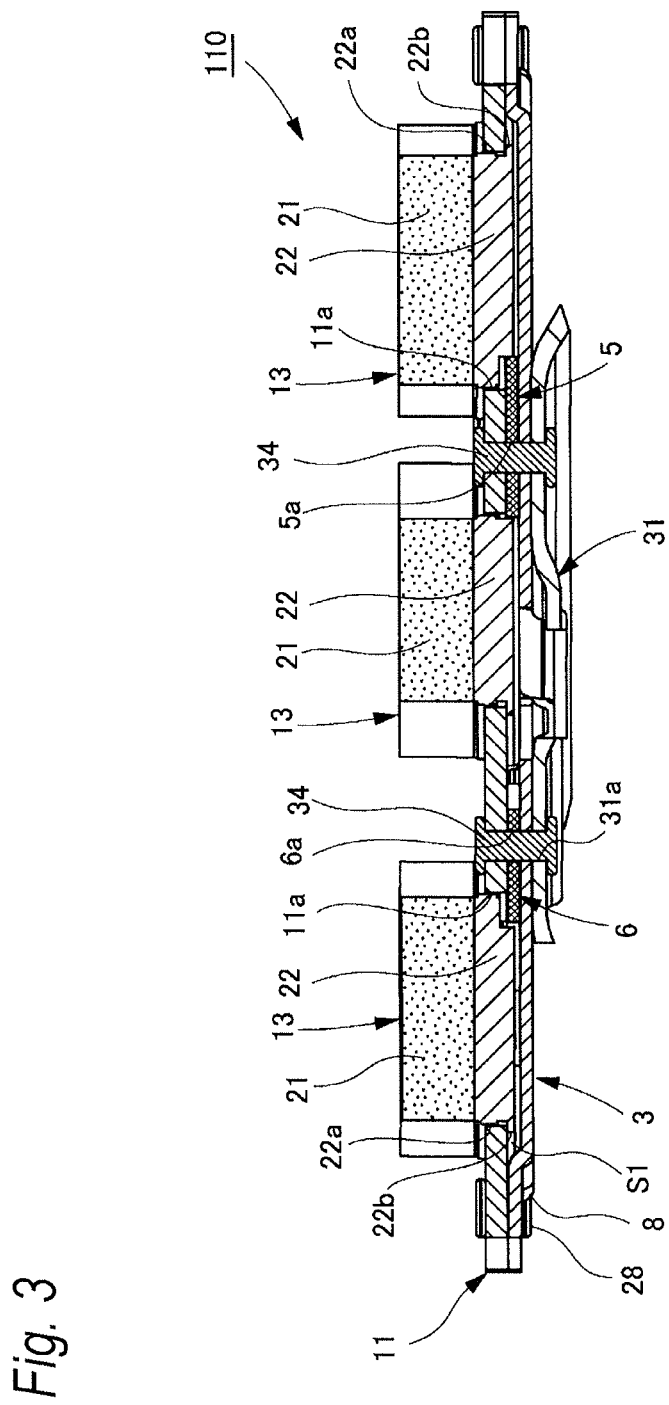
FIG. 3 is a section view taken along the line III-III of FIG. 1.
Figure 4:
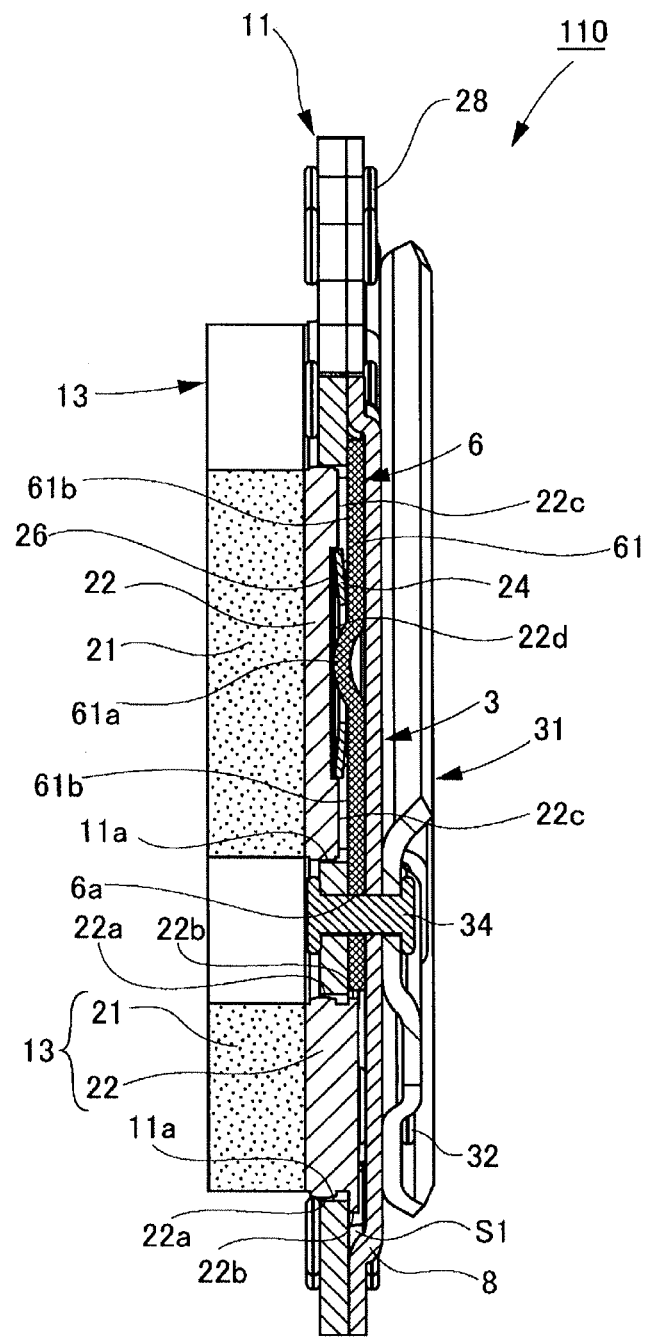
FIG. 4 is a section view taken along the line IV-IV of FIG. 1.

While the lining assemblies 13 are inserted into the guide plate 11 and heat insulation sheets 26 and spring members 24 (both of which are discussed later) are mounted on the back side of the lining assemblies 13, the torque receiving plate 3 together with the link plate 5 is mounted onto the guide plate 11. The torque receiving plate 3, as shown in FIG. 3, in order to provide a clearance S1 between the back plate portions 22 and itself, is formed of a flat plate material into a thin plate which has a peripheral wall 8 formed by projecting the peripheral portion of the flat plate material for sealing the back sides of the back plate portions 22. The torque receiving plate 3 is fixed to the outer peripheral portion of the guide plate 11 by a rivet 28 with a clearance S1 between the back plate portions 22 of the lining assemblies 13 between itself.

To the vicinity of the central portion of the torque receiving plate 3 having an outer peripheral portion fixed to the guide plate 11 with the clearance S1 between the back plate portions 22 of the lining assemblies 13 and itself and to the vicinity of the central portion of the guide plate 11, there are fixed link plates 5, 6 for holding a clearance between the back surface of the guide plate 11 and the front surface of the torque receiving plate 3.

The link plates 5, 6 of this embodiment are fixed by a rivet 34 serving as a fastening member penetrating through the guide plate 11, torque receiving plate 3 and mounting holes 5a, 6a. However, the fastening member is not limited to the rivet 34 but other fastening member such as a bolt/nut can also be used.

As shown in FIGS. 2(a) to 5, an anchor plate 31 is fixed to the back of the torque receiving plate 3 by a rivet 32. The anchor plate 31 is connected to the built-in actuator of the brake caliper (not shown), thereby enabling the disk brake friction pad assembly 100 to advance and retreat with respect to the disk rotor. Further, the anchor plate 31 is also fixed by the rivet 34 for fixing the link plates 5, 6.

The link plates 5, 6 are disposed to straddle over the multiple lining assemblies 13 and apply the pressure from the torque receiving plate 3 to the lining assemblies 13. The link plates 5, 6 respectively include multiple arm portions 51, 61 extending from their central portions having the mounting holes 5a, 6a allowing the rivet 34 to penetrate through them toward the back centers of the back plate portions 22 of the lining assemblies 13. The link plate 5 disposed to straddle over three lining assemblies 13 includes three arm portions 51, whereas the link plate 5 straddling over two lining assemblies 13 includes two arm portions 61.

The arm portions 51, 61 include back plate contact curved portions (curved raised portions) 51a, 61a raised toward the back centers of the back plate portions 22 of the lining assemblies 13, and rotation preventive mechanisms 51b, 61b to be engaged with engagement grooves 22c recess-formed along the diameter directions of the back plate portions 22 of the lining assemblies 13 to prevent the lining assemblies 13 against rotation. The rotation preventive mechanisms 51b, 61b of this embodiment are constituted of the portions of the arm portions 51, 61 that hold the back plate contact curved portions 51a, 61b between them and are opposed to the engagement grooves 22c.

The guide plate 11, as shown in FIG. 1, includes multiple (in this embodiment, five) guide hole portions 11a formed at given intervals, while the lining assemblies 13 are mounted on their associated guide hole portions 11a. The guide plate 11 is made of a flat plate member having a given plate thickness capable of, in braking, receiving a braking torque applied to the lining assemblies 13 mounted on the guide hole portions 11a.

Each lining assembly 13 includes a friction member 21 molded in a substantially disk-like shape and a back plate portion 22 fixed to the back surface of the friction member 21. The back plate portion 22 includes a plate engagement portion 22a having an outer peripheral surface oscillatably engaged with a circular guide hole portion 11a formed penetratingly in the guide plate 11 and a retaining flange portion 22b having an outer diameter larger than the guide hole portion 11a, while they are formed integrally. The back plate portion 22 also includes in its back center a cylindrical spring storing recess 22d for storing one end side (outer diameter side) of a spring member 24 (to be discussed later). The back plate portion 22 further includes, in its outer peripheral portion distant from its back center, a pair of rotation preventive engagement grooves 22c to be engaged with the rotation preventive mechanisms 51b, 61b of the link plates 5, 6.

The friction member 21 has an outer diameter smaller than the inside diameter of the guide hole portion 11a so as to be inserted through the guide hole portion 11a.

The plate engagement portion 22a, in this embodiment, has a curved shape raised toward the guide hole portion 11a in order to make smooth the oscillation of the lining assembly 13 caused by its sliding contact with the guide hole portion 11a.

The lining assembly 13 is inserted into the guide hole portion 11a from the back side of the guide plate 11 such that the friction member 21 can project toward the front of the guide plate 11. The lining assemblies 13 inserted into the guide hole portions 11a are supported and urged toward the guide plate 11 by spring members 24 compressed mounted between the backs of the back plate portions 22 opposed to the link plates 5, 6 and the fronts of the link plates 5, 6.

In this embodiment, the spring member 24 is an annular disc spring having an outer diameter smaller than the inside diameter of the spring storing recess 22d. While one end side (outer diameter side) of the spring member 24 is stored in the spring storing recess 22d, the other end side (inside diameter side) is projected from the spring storing recess 22d and is contacted with the link plates 5, 6, whereby the spring member 24 is compressed.

The spring member 24 may preferably have a plate thickness smaller than the height of the back plate contact curved portions 51a, 61a projectingly provided on the link plates 5, 6 and have a spring constant of 0.3~0.8 N/mm/mm$^2$.

The spring member 24, while it is compressed between the link plates 5, 6 disposed on the front side of the torque receiving plate 3 fixed to the guide plate 11 and back plate portion 22, urges the lining assembly 13 toward the guide plate 11 so that the retaining flange portion 22b can be maintained in contact with the peripheral edge of the guide hole portion 11a. In this case, the spring member 24 is mounted between the back of the back plate portion 22 and the front of the torque receiving plate 3 within the range of 0~60% of an allowable deflection quantity.

Such setting of the spring member 24 can reduce a lining overload phenomenon caused by a difference between the thermal deformations of the rotor surface or by a difference between loads applied to the lining assemblies 13 due to the different lining thicknesses.

A heat insulation sheet 26 is a heat insulation member formed by punching a fiber resin sheet having a thickness of, for example, 0.5 mm or so into an annular shape. The heat insulation sheet 26 prevents the spring member 24 from coming into contact with the back plate portion 22 of the lining assembly 13 to thereby reduce the amount of heat transmitted from the friction member 21 to the spring member 24 in braking and thus reduce the thermal deformation of the spring member 24. Here, the heat insulation member for reducing heat transmission is not limited to the heat insulation sheet 26 but various kinds of heat insulation members can be used, for example, insulation material may be sprayed direct onto the back plate portion 22 to form an insulation layer.

Figure 5:
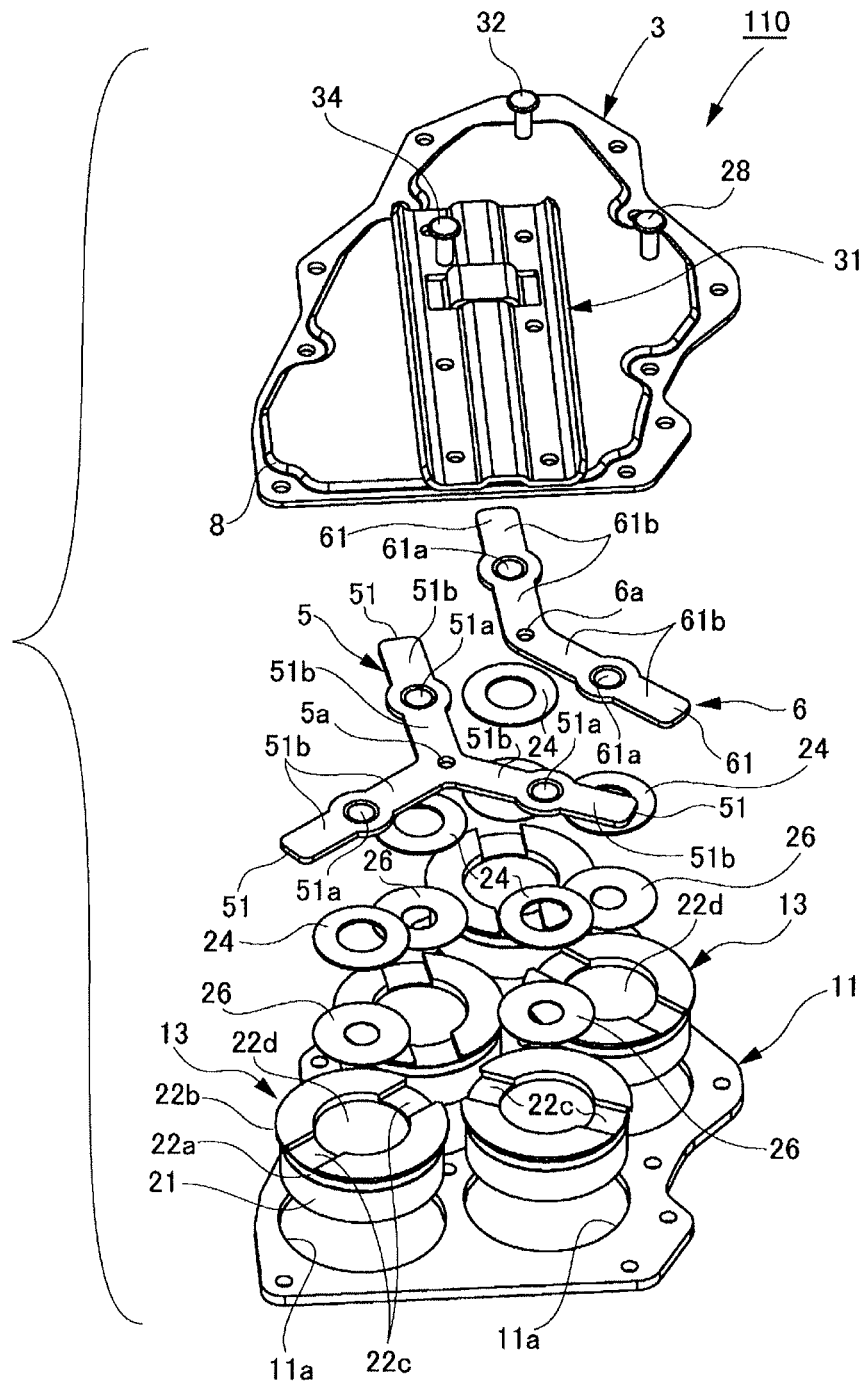
FIG. 5 is an exploded perspective view of the unit friction pad assembly shown in FIG. 2.

Next, description is given of the assembling procedure of the unit friction pad assembly 110 with reference to FIG. 5.

Firstly, into the guide hole portions 11a of the guide plate 11 set with its back facing upward, there are inserted the lining assemblies 13 such that the friction member 21 projects toward the front (in the drawings, downward of) the guide plate 11. After the lining assemblies 13 are inserted into the guide hole portions 11a, the retaining flanges 22b are in contact with the peripheral edges of the guide hole portions 11a.

Next, the heat insulation sheets 26 and spring members 24 are placed sequentially in the spring storing recesses 22d of the back plate portions 22 of the lining assemblies 13.

Further, the mounting holes 5a, 6a are set at given positions in the vicinity of the central portion of the guide plate 11 and, while the back plate contact curved portions 51a, 61a of the arm portions 51, 61 are disposed opposed to the back centers of the back plate portions 22 and the rotation preventive mechanisms 51b, 61 b are engaged with the engagement grooves 22c, the link plates 5, 6 are placed on the lining assemblies 13 and spring members 24.

And, while the heat insulation sheets 26, spring members 24 and rotation preventive link plates 5, 6 are mounted on the backs of the lining assemblies 13, the torque receiving plate 3 is fixed to the outer peripheral portion of the guide plate 11 by the rivet 28. The vicinities of the respective central portions of the torque receiving plate 3 and guide plate 11 are fastened together by the rivet 34 penetrating through the guide plate 11, link plates 5, 6 and torque receiving plate 3.

In the above-described disk brake friction pad assembly 100 of this embodiment, while the torque receiving plate 3 is moved toward the disk rotor by the built-in actuator of the brake caliper to press the friction member 21 against the disk rotor, when a pressing load acting on the friction member 21 exceeds a set load, the spring members 24 are deflected to bring the backs of the back plate portions 22 into contact with the back plate contact curved portions 51a, 61a of the link plates 5, 6, and the back plate contact curved portions 51a, 61a allow the inclination of the lining assemblies 13.

Such areas of the back plate portions 22 (the bottom faces of the spring storing recesses 22d) as are contacted by the back plate contact curved portions 51a, 61a are finished as flat and smooth surfaces so that, in the oscillation of the lining assemblies 13, the contact points are allowed to move freely with the oscillation.

In the disk brake friction pad assembly 100 of this embodiment, the position of the lining assembly 13 with respect to the torque receiving plate 3, in the direction of the lining assembly 13 parallel to the disk rotor surface, is regulated by the engagement between the plate engagement portion 22a of the lining assembly 13 and the guide hole portion 11a of the guide plate 11, whereas, in a direction perpendicular to the disk rotor surface, it is regulated by the urging force of the spring member 24 interposed between the back of the back plate portion 22 and the link plates 5, 6 disposed on the front side of the torque receiving plate 3.

Therefore, a braking torque applied to the lining assembly 13 in braking is transmitted to the guide plate 11 and is transmitted direct to the torque receiving plate 3 with the guide plate 11 fixed thereto.

The pressure pressing the lining assemblies 13 against the disk rotor in braking is applied from the torque receiving plate 3 through the link plates 5, 6 and spring members 24 to the lining assemblies 13.

That is, since the member (guide plate 11) for receiving the braking toque from the lining assemblies 13 and the members (link plates 5, 6 and torque receiving plate 3) for applying the pressure to the lining assemblies 13 are provided separately, a braking torque providing a large load is not applied to the contact portions of the spring members 24 for applying pressure to the lining assemblies 13 with the lining assemblies 13 nor to the contact portions of the spring members 24 with the link plates 5, 6.

Therefore, the contact portions of the spring members 24 for transmitting the pressure with the lining assemblies 13 or link plates 5, 6 need not be engaged by a firm engaging device such as a ball joint for receiving the braking torque, thereby being able to ease the working precision thereof. This can realize reduced cost and enhanced productivity.

In the above disk brake friction pad assembly 100, while the multiple lining assemblies 13 are arranged in a plane, the spring members 24 interposed between the backs of the lining assemblies 13 and link plates 5, 6 absorb the thickness-direction dimension tolerance of the lining assemblies 13, thereby preventing the contact performance of the lining assemblies 13 with the disk rotor from varying.

Therefore, stable braking characteristics can be maintained free from the influence of the thickness-direction dimension tolerance of the lining assemblies 13.

In the above disk brake friction pad assembly 100, the guide plate 11 and torque receiving plate 3 are fastened together in their respective outer peripheral portions by the rivet 28 to thereby provide an integrated box structure and, to the vicinities of the respective central portions of the torque receiving plate 3 and guide plate 11, there are fixed the link plates 5, 6 which can support a portion of the pressure applied to the torque receiving plate 3 in the vicinity of the central portion of the torque receiving plate 3. Thus, the rigidity of the torque receiving plate 3 with its outer peripheral portion fixed to the guide plate 11 is higher than when the link plates 5, 6 are not fixed, thereby being able to reduce the plate thickness of the torque receiving plate 3 itself. Therefore, due to the eased working precision of parts used and the reduced weight thereof, cost reduction and productivity enhancement can be realized.

In the above disk brake friction pad assembly 100, the link plates 5, 6 include the back plate contact curved portions 51a, 61a formed integrally therewith which, when a pressing load applied to the friction member 21 exceeds a set load, support the lining assemblies 13 so as to be able to be inclined, thereby avoiding additional use of an independent exclusive part such as a universal joint. This can prevent the increased cost caused by the increased number of parts and the degraded productivity caused by the increased number of assembling steps.

In the above disk brake friction pad assembly 100, the guide plate 11 for receiving a braking torque acting on the lining assemblies 13 mounted into their respective guide hole portions 11a is formed of a flat plate member having a given plate thickness. This enables the inner peripheral surfaces of the guide hole portions 11a of the guide plate 11 extending in the plate thickness direction to receive a braking torque applied from the lining assemblies 13 in braking. Thus, the guide plate 11 having a given plate thickness and thus having sufficient rigidity raises no fear that, like the guide hole portions of a guide plate bent formed of a thin plate member, the guide hole portions can be bending deformed by a braking torque applied from the lining assemblies. This can secure the smooth oscillation of the lining assemblies 13 in the guide hole portions 11a.

In the above disk brake friction pad assembly 100, for transmission of a braking torque, the plate engagement portions 22a to be contacted with the inner surfaces of the guide hole portions 11a of the guide plate 11 have a curved shape raised toward the guide hole portions 11a. Therefore, in the oscillation of the lining assemblies 13, the plate engagement portions 22a are able to slide on the inner peripheral surfaces of the guide hole portions 11a with a low frictional force, whereby the oscillation of the lining assemblies 13 caused by sliding contact between the plate engagement portions 22a and guide hole portions 11a can be made smooth.

In the above disk brake friction pad assembly 100, the back plate portions 22 include the spring storing recesses 22d for storing one end side (outer diameter side) of the spring members 24 and the engagement grooves 22c to be engaged by the rotation preventive mechanisms 51b, 61b. This enables the heat insulation sheets 26 and spring members 24 to be positioned between the back plate portions 22 and link plates 5, 6 and can prevent a position clearance between the back plate portions 22 and link plates 5, 6 from increasing. Thus, the dimension of the disk brake friction pad assembly 100 in a direction perpendicular to the sliding surface of the disk rotor can be reduced and the size of the assembly can be made compact.

In the above disk brake friction pad assembly 100, to enhance the transmission efficiency of a braking torque when the lining assemblies 13 are contacted with the disk rotor, the rotation regulation of the lining assemblies 13 within a plane parallel to the disk rotor surface is attained by engagement between the engagement holes 22c formed in the back plate portions 22 of the lining assemblies 13 and the rotation preventive mechanisms 51b, 61b of the link plates 5, 6. That is, since an independent exclusive part is not added to regulate the rotation of the lining assemblies 13 within a plane parallel to the disk rotor surface, the number of parts is not increased for the rotation regulation of the lining assemblies 13, thereby being able to prevent increased cost caused by the increased number of parts and degraded productivity caused by the increased number of assembling steps.

Figure 6:
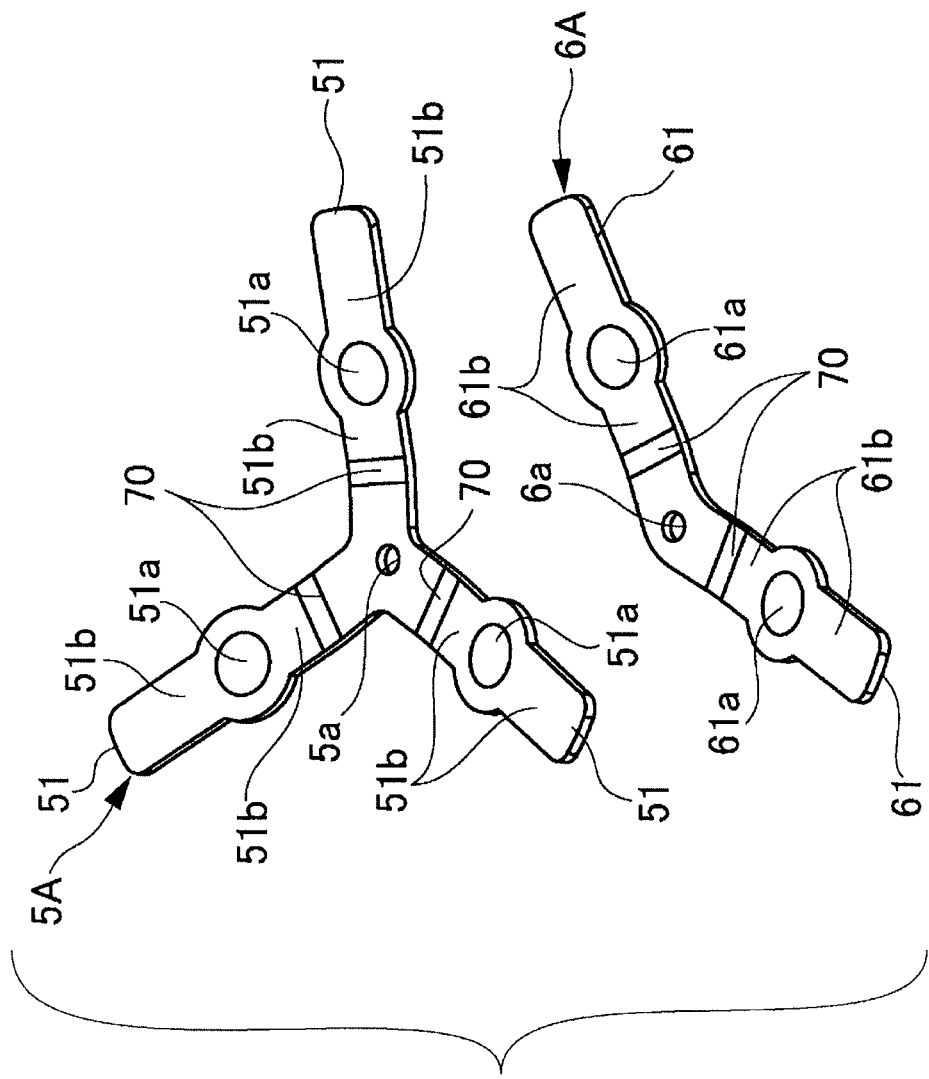
FIG. 6 is an enlarged section view of a modification of a main portion of a link plate shown in FIG. 5.

FIG. 6 is an enlarged section view of a modification of a main portion of the link plates 5, 6 shown in FIG. 5.

The link plates 5A, 6A shown in FIG. 6 are similar in structure to the above link plates 5, 6 except that they include spring mechanisms 70 for urging the back plate portions 22 toward the guide plate 11. Thus, the common parts are given the same designations and the specific description thereof is omitted.

The link plates 5A, 6A include spring mechanisms 70 interposed between the mounting holes 5a, 6a and back plate contact curved portions 51a, 61a of the arm portions 51, 61. The spring mechanisms 70 are structured such that, when the leading end sides of the arm portions 51, 61 are bent toward the guide plate 11 and are thereby fixed between the torque receiving plate 3 and guide plate 11, the leading end sides of the arm portions 51, 61 elastically urge the back plate portions 22 toward the guide plate 11.

In this structure, even when the spring members 24 are permanently deformed (settled) due to heat or the like in braking, the lining assemblies 13 can be urged toward the guide plate 11 by the elastically urging forces of the link plates 5A, 6A so that the retaining flange portions 22b of the back plate portions 22 can be maintained in contact with the peripheral edges of the guide hole portions 11a.

Figure 7:
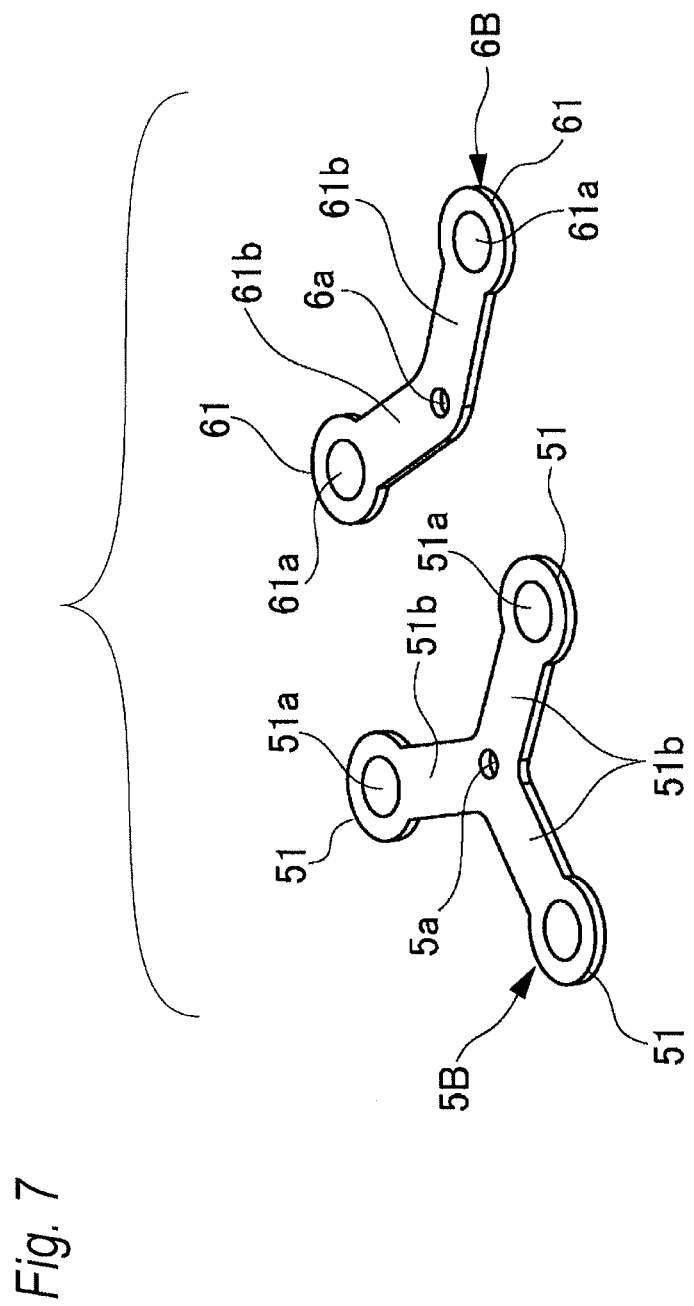
FIG. 7 is an enlarged section view of a modification of a main portion of the link plate shown in FIG. 5.

FIG. 7 is an enlarged perspective view of another modification of a main portion of the link plates 5, 6 shown in FIG. 5.

Link plates 5A, 6A shown in FIG. 7 are similar in structure to the above link plates 5, 6 except that such areas of the arm portions 51, 61 as exist forwardly of the back plate contact curved portions 51a, 61a are omitted. Thus, the common parts are given the same designations and the specific description thereof is omitted.

In the link plates 5B, 6B, since only the portions thereof existing forwardly of the back plate contact curved portions 51a, 61b of the arm portions 51, 61 are disposed opposed to the engagement grooves 22c to form the rotation preventive mechanisms 51b, 61b, while they are lighter and more compact than the link plate 5, 6, they can provide equivalent effects.

Here, the characteristics of the embodiment of the above disk brake friction pad assembly of the invention are briefly summarized in the following items i-vi.

[i] A disk brake friction pad assembly 100, comprising:
a guide plate 11 for receiving a braking torque; and
a plurality of lining assemblies 13 oscillatably supported by the guide plate 11 to be pressed against a disk rotor,
wherein each of the lining assemblies 13 includes, in a back plate portion 22 thereof fixed to the back of a friction member 21, a plate engagement portion 22a with an outer peripheral surface thereof oscillatably engaged with a guide hole portion 11a formed in the guide plate 11 and a retaining flange portion 22b having an outer diameter larger than the guide hole portion 22a,
each of the lining assemblies 13 is inserted into the guide hole portion 22a from the back of the guide plate 11 so as to transmit a braking torque generated at the time of contact between the disk rotor and the friction member 21 from the plate engagement portion 22a to the guide plate 11,
each of the lining assemblies 13 is supported and urged toward the guide plate 11 by a spring member 24 provided on the back of the back plate portion 22, and
an outer peripheral portion of a torque receiving plate 3 is fixed to the guide plate 11 with a clearance between the back plate portion 22 and itself, and
a link plate 5, 6 straddling over the lining assemblies 13 for applying a pressure from the torque receiving plate 3 to the lining assemblies 13 is fixed between the torque receiving plate 3 and the guide plate 11 at a vicinity of a central portion of the torque receiving plate 3 and the guide plate 11, so as to hold a clearance between the guide plate 11 and the torque receiving plate 3.

[ii] The disk brake friction pad assembly according to the above [i], wherein the link plate 5, 6 includes a rotation preventive mechanism 51b, 61b engaged with an engagement groove 22c recess-formed in the back plate portion 22 so as to prevent the lining assemblies 13 against rotation.

[iii] The disk brake friction pad assembly according to the above [i] or [ii], wherein a heat insulation member (a heat insulation sheet) 23 is interposed between the back plate portion 22 and the spring member 24.

[iv] The disk brake friction pad assembly according to any one of the above [i] to [iii], wherein the link plate 5A, 6A include a spring mechanism 70 urging the back plate portion 22 toward the guide plate 11.

Here, the disk brake friction pad assembly of the invention is not limited to the above embodiment but proper changes and improvements are possible.

For example, when a disk brake friction pad assembly is constituted of multiple unit friction pad assemblies, the number of unit friction pad assemblies may be one or three or more.

The link plate is not limited to the above embodiment but, of course, various embodiments can be employed so long as the link plate is fixed between a guide plate and torque receiving plate to hold a clearance between them, and is disposed to straddle over multiple lining assemblies to be able to apply the pressure from the torque receiving plate to the lining assemblies.

The present application is based on Japanese Patent Application (Application No. 2012-093293) filed on Apr. 16, 2012, and the content thereof are incorporated herein by reference.

INDUSTRIAL APPLICABILITY

According to the disk brake friction pad assembly of the invention, by easing the working precision of parts used and reducing the weights thereof, cost reduction and enhanced productivity can be realized.

REFERENCE SIGNS LIST

3: torque receiving plate
5, 6: link plate
11: guide plate
11a: guide hole portion
13: lining assembly
21: friction member
22: back plate portion
22a: plate engagement portion
22b: retaining flange portion
22c: engagement groove
22d: spring storing recess
24: spring member
26: heat insulation sheet (heat insulation member)
28: rivet
31: anchor plate
32: rivet
34: rivet
51: arm portion
51b: rotation preventive mechanism
61: arm portion
61b: rotation preventive mechanism
70: spring mechanism
100: disk brake friction pad assembly
110, 120: unit friction pad assembly

The invention claimed is:

1. A disk brake friction pad assembly, comprising:
a guide plate for receiving a braking torque; and
a plurality of lining assemblies oscillatably supported by the guide plate to be pressed against a disk rotor,
wherein each of the lining assemblies includes, in a back plate portion thereof fixed to the back of a friction member, a plate engagement portion with an outer peripheral surface thereof oscillatably engaged with a guide hole portion formed in the guide plate and a retaining flange portion having an outer diameter larger than the guide hole portion,
each of the lining assemblies is inserted into the guide hole portion from the back of the guide plate so as to transmit a braking torque generated at the time of contact between the disk rotor and the friction member from the plate engagement portion to the guide plate,
each of the lining assemblies is supported and urged toward the guide plate by a spring member provided on the back of the back plate portion, and
an outer peripheral portion of a torque receiving plate is fixed to the guide plate with a clearance between the back plate portion and itself, and
a link plate straddling over the lining assemblies for applying a pressure from the torque receiving plate to the lining assemblies is fixed by a fastening member between the torque receiving plate and the guide plate at a vicinity of a central portion of the torque receiving plate and the guide plate, so as to hold a clearance between the guide plate and the torque receiving plate.

2. The disk brake friction pad assembly according to claim 1,
wherein the link plate includes a rotation preventive mechanism engaged with an engagement groove recess-formed in the back plate portion so as to prevent the lining assemblies against rotation.

3. The disk brake friction pad assembly according to claim 1,
wherein a heat insulation member is interposed between the back plate portion and the spring member.

4. The disk brake friction pad assembly according to claim 1,
wherein the link plate includes a spring mechanism urging the back plate portion toward the guide plate.

\* \* \* \* \*